(12) United States Patent
Hawkins

(10) Patent No.: US 8,328,097 B2
(45) Date of Patent: Dec. 11, 2012

(54) MULTI-PURPOSE APPENDABLE MARKING METHOD

(75) Inventor: Roland C. Hawkins, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 12/861,899

(22) Filed: Aug. 24, 2010

(65) Prior Publication Data

US 2012/0048929 A1 Mar. 1, 2012

(51) Int. Cl.
*G06F 19/00* (2006.01)
*G06Q 30/00* (2006.01)
*G06Q 90/00* (2006.01)

(52) U.S. Cl. .................. 235/385; 235/375; 235/487
(58) Field of Classification Search .................. 235/385, 235/375, 487, 462.01
See application file for complete search history.

(56) References Cited

U.S. PATENT DOCUMENTS

| | | | |
|---|---|---|---|
| 4,506,999 A | 3/1985 | Robertson | |
| 2003/0102293 A1 | 6/2003 | Therond | |
| 2004/0012906 A1 | 1/2004 | Auray et al. | |
| 2006/0274942 A1* | 12/2006 | Ihara et al. | 382/181 |
| 2007/0145735 A1* | 6/2007 | Lawandy et al. | 283/72 |

FOREIGN PATENT DOCUMENTS

EP  0511133  10/1992

* cited by examiner

*Primary Examiner* — Edwyn Labaze
(74) *Attorney, Agent, or Firm* — Quinn Law Group, PLLC

(57) ABSTRACT

A method of marking and a method of tracking an object having a surface are disclosed. The method of marking includes generating a mark on the surface of the object, generating an attribute on the object, and appending the mark to indicate the generated attribute. The method of tracking the marked object includes acquiring a mark positioned in a sequential data region on the surface of the object, and acquiring an image of the attribute. The method of tracking also includes analyzing a code positioned in an auxiliary data region, wherein the auxiliary code corresponds to the attribute, and analyzing the attribute for a presence of a condition. Furthermore, the method of tracking includes storing the mark, the auxiliary code, and the image of the feature if the predetermined condition is present. A mark for identifying an object having a surface and an attribute is also disclosed.

20 Claims, 1 Drawing Sheet

MULTI-PURPOSE APPENDABLE MARKING METHOD

TECHNICAL FIELD

The present invention relates to a method for applying an appendable mark onto an object, i.e., a mark configured with a provision for being appended after the mark has been applied to the object.

BACKGROUND

A variety of methods have been developed for marking and subsequent identification of various items, such as groceries and automobile components. Such marking methods are typically employed for keeping track of items during their storage, distribution, and sale.

One frequently used method for marking an object is data matrix bar coding. Typically, a data matrix code is a two-dimensional, rectangular pattern of characters having a predetermined number of rows and columns. The information to be encoded can be in a text format, or may be encoded as raw data. Generally, encoded data ranges from a few bytes up to 2 kilobytes. The length of the encoded data depends on the dimensions of the matrix being used. As more data is encoded in the matrix, the number of cells in the rows and columns of the matrix will increase. Data matrix sizes generally vary from 8×8 to 144×144. A data matrix is generally capable of storing up to 2,335 alphanumeric characters.

SUMMARY

A method for marking and a method for tracking an object having a surface are disclosed. The method for marking includes generating a mark in the form of a sequential data image on the surface of the object. The method for marking also includes generating an attribute on the object, such as performing an operation that modifies an aspect of the object. Additionally, the method for marking includes appending the mark to signify or indicate the generated attribute.

The mark may include a sequential data region, and the act of generating the mark may include depositing a serialization code, i.e., a two-dimensional data matrix code, in the sequential data region. The serialization code may be configured to identify the object. The sequential data region may be framed, i.e., surrounded by a feature configured to establish one of a continuous and a discontinuous border around the sequential data region, such that the feature is capable of being sensed. The feature may include at least one linear marker.

The mark may include an auxiliary data region. In such a case, the act of appending the mark may include depositing in the auxiliary data region an auxiliary code having at least one character, such that the auxiliary data region is positioned outside the border. The code may include a sequence of characters, such that at least one of the number and the type of the at least one character is indicative of the generated attribute or an operation performed on the object. The positioning of the at least one character within the code may be indicative of the generated attribute.

The sequential data region may have a substantially rectangular two-dimensional shape. The auxiliary data region may be disposed along a side of the substantially rectangular two-dimensional shape. The auxiliary data region may include positions for multiple rows of characters.

The method for tracking the marked object having an attribute and a surface includes acquiring the mark described above, wherein the mark is positioned on the surface and has a serialization code that is indicative of the object. The method for tracking also includes acquiring an image of the attribute, and analyzing an auxiliary data region that is positioned in the mark. The auxiliary data region includes an auxiliary code having at least one character, wherein the auxiliary code is indicative of the attribute. The method for tracking additionally includes analyzing the attribute for a presence of a condition, which may be a specific physical feature, non-compliance with a prescribed requirement, or a defect.

Furthermore, the method for tracking may include storing the auxiliary code and the serialization code if the predetermined condition is present. The image of the attribute may also be stored. According to the method for tracking, the acts of storing the auxiliary code and the serialization code may be accomplished in a memory of a data acquisition system. The image of the attribute may also be stored in the memory of the data acquisition system.

A mark for identifying an object having a surface and an attribute is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
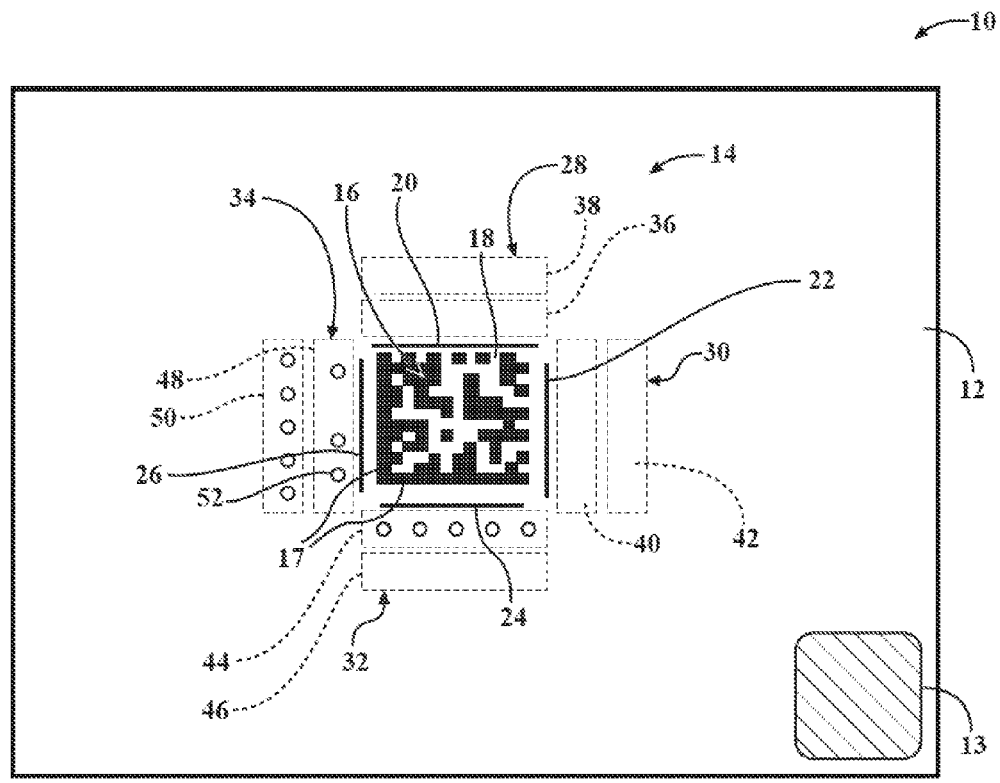
FIG. 1 is a depiction of an appendable mark according to one embodiment.

Referring to the drawings wherein like reference numbers correspond to like or similar components throughout the several figures, FIG. 1 illustrates a schematically represented object denoted by numeral 10. Object 10 may be any manufactured component, such as a casting of a cylinder head for an internal combustion engine. Object 10 includes an outer surface 12 configured to accept a mark 14 in the form of a sequential data image.

Mark 14 is a machine readable, i.e., capable of being acquired or sensed, two-dimensional, generally rectangular data matrix that is configured to contain encoded information for marking and identifying object 10. Additionally, mark 14 is intended to be applied to surface 12 by any appropriate image generating process such as ink-marking, embossing, or etching via a specifically adapted device.

Mark 14 includes a sequential data region 16 configured to accept a digital serialization code 18 that is indicative of, i.e., configured to identify, the object 10. Serialization code 18 is characterized by a specific number of rows and columns arranged from distinct cells that are selectively filed with "light" and "dark" elements which represent bits, i.e., units of information. Serialization code 18 may also be displayed or represented in an alphanumeric form. Depending on a particular situation a "light" element may represent a 0 and a "dark" element may represent a 1, or vice versa. As more data is encoded in the sequential data region 16, the number of cells in rows and columns will increase.

Sequential data region 16 is framed by linear markers 20, 22, 24, and 26. Linear markers 20, 22, 24, and 26 are shown as a graphical imprint deposited on surface 12, but may also be generated with a stand-off or a relief form relative to surface 12. As shown, linear markers 20, 22, 24, and 26 are set apart from the sequential region 16 and are positioned to establish a discontinuous border around the sequential data region 16. Linear markers 20, 22, 24, and 26 are configured to be sensed by a human eye, an optical device, and/or by a tactile probe (not shown). Linear markers 20, 22, 24, and 26 function as a "finder pattern", i.e., a feature that is positioned in a predetermined location with respect to the sequential data region 16, such that the serialization code 18 may be located and read.

Linear markers 20, 22, 24, and 26 may all be identical, or have a dissimilar shape, length, and/or thickness to facilitate orientation of mark 14 prior to the serialization code 18 being read. Although discontinuous linear markers 20, 22, 24, and 26 are shown, nothing precludes the use of a single continuous border, or any other appropriate feature(s) that is capable of being sensed, in order to delineate and/or orient sequential data region 16. Alternatively, the serialization code 18 may be sensed by an optical device to identify positional data, such as solid lines 17, in order to facilitate appropriate orientation of the mark 14.

Mark 14 includes auxiliary data regions 28, 30, 32, and 34 that are positioned outside the border established by linear markers 20, 22, 24, and 26, each data region provided along one side of the substantially rectangular shape of the sequential data region 16. Each auxiliary data region 28, 30, 32, and 34 is a two-dimensional, generally rectangular zone configured to accept an auxiliary code 52. Auxiliary code 52 includes at least one symbol or character, but typically will include a sequence of characters that is indicative of an attribute that is generated on the object 10, thus modifying and differentiating the object from its initial, i.e., unmodified, configuration. Outer surface 12 of the object 10 includes a physical element, which, in the case of the cylinder head for an internal combustion engine, may be a cast-in boss or any other feature of the object. As shown, the physical element may be machined or faced by an appropriate apparatus, such that a substantially new attribute 13, for example a machined boss having specific dimensions, is generated on the outer surface 12 of object 10. To record and signify the generation of attribute 13, mark 14 is appended by having auxiliary code 52 deposited in at least one of the appropriate auxiliary data regions 28, 30, 32, and 34.

The characters of the auxiliary code 52 may be of any type, shape, and size suitable to being sensed by a human eye, an optical device, and/or by a tactile probe, for example a sequence of dots shown in FIG. 1. The number and the positioning of characters within the sequence of auxiliary code 52 may be specifically selected to be indicative of the attribute 13. Each auxiliary data region 28, 30, 32, and 34 includes discrete positions for multiple rows of characters, as shown by a pair of rows 36 and 38 of auxiliary data region 28, a pair of rows 40 and 42 of auxiliary data region 30, a pair of rows 44 and 46 of auxiliary data region 32, and a pair of rows 48 and 50 of auxiliary data region 34. Although two rows of characters are shown for each auxiliary data region 28, 30, 32, and 34, nothing precludes the provision of as many such rows as necessary to encode the desired information.

Figure 2:
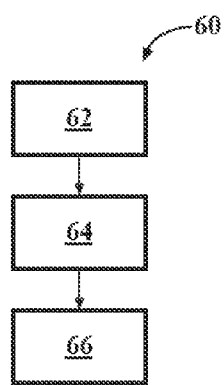
FIG. 2 is a flow chart illustrating a method for marking the object with the mark depicted in FIG. 1.

A method 60 for marking object 10 with mark 14 is shown in FIG. 2, and described below with respect to FIG. 1. Method 60 commences in frame 62 with generating mark 14 on the surface 12 of object 10. Following frame 62, in frame 64 the method includes generating attribute 13 on object 10. Frame 66 includes appending mark 14 to signify or indicate the generated attribute 13. Mark 14 is appended by populating any of the auxiliary data regions 28, 30, 32, and 34 with auxiliary code 52 configured from appropriate symbols or characters. Characters of auxiliary code 52 may also be positioned in a specific sequence and in appropriate locations within the auxiliary data regions 28, 30, 32, and 34 to signify or indicate that object 10 has been modified from its initial or original configuration. Alternatively, object 10 may be initially coded with auxiliary code 52 in the appropriate auxiliary data regions 28, 30, 32, and 34 to signify the formation of attribute 13 that will take place subsequent to the codification.

Figure 3:
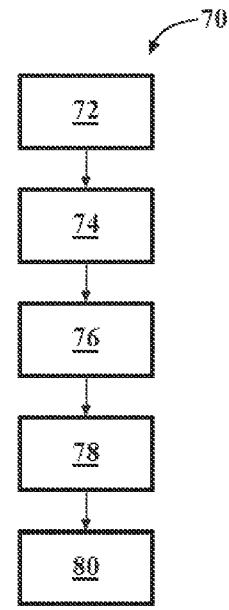
FIG. 3 is a flow chart illustrating a method for tracking an object with the mark depicted in FIG. 1, and in accordance with the method for marking illustrated in FIG. 2.

A method 70 for tracking object 10 that includes mark 14 is shown in FIG. 3, and described below with respect to FIG. 1. Method 70 commences in frame 72 with acquiring mark 14 that is configured to identify object 10. The mark may be acquired or sensed via an appropriate image sensing apparatus, such as an optical device, and/or a tactile probe. Following frame 72, the method proceeds to frame 74, and includes acquiring or sensing an image of the attribute 13 by an appropriate image sensing apparatus. After frame 74 the method advances to frame 76, where the method includes analyzing auxiliary data regions 28, 30, 32, and 34 for the auxiliary code 52 that is indicative, i.e., represents, attribute 13. The method includes analyzing feature 13 for a presence of a predetermined condition, such as a particular physical dimension, non-compliance with some prescribed requirement, or a defect in frame 78, following which the method may proceed to frame 80.

According to the method, storing mark 14, which includes the auxiliary code 52 and the serialization code 18, may be included in frame 80, if the predetermined condition is present. In such a case, the image of attribute 13 may also be stored. The image of the mark 14, the auxiliary code 52, and the image of attribute 13 may also be transmitted for archiving and future reference. Method 70 may also include combining the auxiliary code 52 of auxiliary data regions 28, 30, 32, and 34 with the serialization code 18 of the sequential data image 14, and storing and/or transmitting the combined codes 18 and 52, if the predetermined condition is present.

While the best modes for carrying out the invention have been described in detail, those familiar with the art to which this invention relates will recognize various alternative designs and embodiments for practicing the invention within the scope of the appended claims.

The invention claimed is:

1. A method for marking an object having a surface, the method comprising:
   generating a mark on the surface;
   generating an attribute on the object; and
   appending the mark to indicate the generated attribute.

2. The method of claim 1, wherein the mark includes a sequential data region, and said generating a mark includes depositing a serialization code in the sequential data region, and wherein the serialization code is configured to identify the object.

3. The method of claim 2, wherein the sequential data region is framed by a feature configured to establish one of a continuous and a discontinuous border around the sequential data region, such that the feature is capable of being sensed.

4. The method of claim 3, wherein the feature includes at least one linear marker.

5. The method of claim 3, wherein the mark includes an auxiliary data region positioned outside the border, and said appending the mark includes depositing in the auxiliary data region an auxiliary code having at least one character.

6. The method of claim 5, wherein the auxiliary data region includes positions for multiple rows of characters.

7. The method of claim 5, wherein the at least one character is a sequence of characters, such that at least one of the number and the type of characters in the sequence of characters is indicative of the generated attribute.

8. The method of claim 5, wherein the sequential data region has a substantially rectangular two-dimensional shape and the auxiliary data region is disposed along a side of the substantially rectangular two-dimensional shape.

9. A method for tracking a marked object having an attribute and a surface, the method comprising:
    acquiring a mark that is positioned on the surface and includes a sequential data region having a serialization code and an auxiliary data region having an auxiliary code that includes at least one character, wherein the serialization code is configured to identify the object and the auxiliary code is indicative of the attribute;
    acquiring an image of the attribute;
    analyzing the auxiliary code; and
    analyzing the attribute for a presence of a predetermined condition.

10. The method of claim 9, wherein the auxiliary data region includes positions for multiple rows of characters.

11. The method of claim 9, further comprising storing the auxiliary code and the serialization code if the predetermined condition is present, wherein said storing the auxiliary code and the serialization code is accomplished in a memory of a data acquisition system.

12. The method of claim 9, wherein the sequential data region is framed by a feature configured to establish one of a continuous and a discontinuous border around the sequential data region, such that the feature is capable of being sensed, and wherein the auxiliary data region is positioned outside the border.

13. The method of claim 9, wherein the at least one character is a sequence of characters, such that at least one of the number and the type of characters in the sequence of characters is indicative of the attribute.

14. The method of claim 9, wherein the sequential data region has a substantially rectangular two-dimensional shape and the auxiliary data region is disposed along a side of the substantially rectangular two-dimensional shape.

15. A mark for identifying an object having a surface and an attribute, the mark comprising:
    a sequential data region;
    a serialization code deposited in the sequential data region and configured to identify the object; and
    an auxiliary data region for depositing an auxiliary code having at least one character, wherein the auxiliary code is configured to append the mark for indicating the attribute.

16. The mark of claim 15, wherein the sequential data region is framed by a feature configured to establish one of a continuous and a discontinuous border around the sequential data region, such that the feature is capable of being sensed, and wherein the auxiliary data region is positioned outside the border.

17. The mark of claim 16, wherein the feature includes at least one linear marker.

18. The mark of claim 15, wherein the auxiliary data region includes positions for multiple rows of characters.

19. The mark of claim 15, wherein the at least one character is a sequence of characters, such that at least one of the number and the type of characters in the sequence of characters is indicative of the attribute.

20. The mark of claim 15, wherein the sequential data region has a substantially rectangular two-dimensional shape and the auxiliary data region is disposed along a side of the substantially rectangular two-dimensional shape.

* * * * *